United States Patent [19]
Pullum et al.

[11] 3,887,749
[45] June 3, 1975

[54] STABILIZATION OF POLYESTER FILAMENTARY MATERIAL

[75] Inventors: Donald G. Pullum, Chesterfield; Eugene J. Corrigan, Village of Chester; Bernard H. Howard, Petersburg; Bernard D. Stabley, Village of Chester, all of Va.

[73] Assignee: The Firestone Tire & Rubber Company, Akron, Ohio

[22] Filed: Aug. 21, 1972

[21] Appl. No.: 282,878

[52] U.S. Cl. 428/284; 156/110; 260/3; 260/45.75 C
[51] Int. Cl. C09k 3/28
[58] Field of Search ......... 117/138.8 F, 138, 160 R, 117/136, 137; 8/177 C; 161/55, 141, 144; 156/110 A, 110 C, 110 D

[56] References Cited
UNITED STATES PATENTS

| | | | |
|---|---|---|---|
| 3,369,057 | 2/1968 | Twilley | 260/857 |
| 3,446,766 | 5/1969 | Taylor | 260/22 |
| 3,661,623 | 5/1972 | Bhakuni et al. | 117/76 T |

*Primary Examiner*—Thomas J. Herbert, Jr.
*Assistant Examiner*—Bruce H. Hess

[57] ABSTRACT

Spun filaments, yarns, cords or fabrics of polyester are surface-treated with a solution or dispersion of a cupric compound. The treated filaments, etc. have greatly enhanced heat resistance, and are particularly suitable for use in tire cord and similar applications.

3 Claims, 5 Drawing Figures

STABILIZATION OF POLYESTER FILAMENTARY MATERIAL

FIELD OF THE INVENTION

This invention relates to the stabilization of polyester filaments, yarns, cords and fabrics against degradation by heat, as when used in the reinforcement of tires, power transmission belting, conveyor belting, pump diaphragms, and other industrial applications in which the treated filaments, etc. are enclosed in rubber and heat is generated within the products when used.

Different polymers undergo different types of degradation when subjected to heat. For instance, nylon when heated in a vacuum is not degraded as much as in air. On the other hand, polyester undergoes no substantial degradation by heat alone, whether in a vacuum or air, but when incorporated in rubber, as when used for the reinforcement of rubber, it undergoes undesirable degradation when heated.

PRIOR ART

It has been proposed in Taylor U.S. Pat. No. 3,264,255 to incorporate finely divided metallic copper into a melt of polyester resin which is to be spun into filaments, the metal preferably being removed by filtration before the actual spinning. The presence of the copper is said to minimize degradation, discoloration and evolution of carboxyl compounds in the melt. Also, it has been proposed in Twilley U.S. Pat. No. 3,369,057, column 7, line 20, to incorporate unspecified copper compounds into mixed melts of polyesters and polyamides, as a stabilizing agent, and to use copper acetate in the polyamide (column 10, line 69) as a heat stabilizer. Likewise, it has been proposed in Ianicelli U.S. Pat. No. 3,068,207 to incorporate copper chelates into polyester melts to enhance the dyeability of filaments spun therefrom. Such processes may have serious disadvantages in building up obstructions in the melting and spinning apparatus, due both to particles of metal in the stream and to "plating out" of copper upon the equipment surfaces exposed to the melt.

OBJECTS OF THE INVENTION

It is an object of this invention to provide a novel heat stabilization system by the surface treatment of polyester filaments, yarns, cords and fabrics with a cupric compound.

Another object is to provide such a process which will avoid the difficulties of obstructing the equipment with metallic particles and plating out characteristics of prior processes.

A further object is to avoid the complications involved in incorporating and dispersing materials into polyester melts.

A still further object is to stabilize polyester filaments by a procedure which may be integrated into the conventional manufacture of polyester filaments, yarns, cords and fabrics without any substantial disruption thereof.

SUMMARY OF THE INVENTION

The above and other objects are secured, in accordance with this invention, by contacting already fabricated polyester filaments, or yarns, or cords, or fabrics at relatively low processing temperatures with a solution or dispersion of a cupric compound.

Solidified polyester filaments whether treated as such, or after fabrication into yarns or cords or woven into fabrics, are relatively impermeable to the diffusion of materials, and it would not be expected that mere contact with the treating material would have much effect one way or another on the products. Surprisingly, however, the treated filamentary materials exhibit a high degree of stability against heat degradation in service, for instance, when used as embedded reinforcements in elastomeric articles such as tires, power transmission belting, conveyor belting, particularly such as are used for conveying hot materials such as quenched ashes, and pump and other diaphragms subjected to severe flexing and/or exposure to hot media.

The application of the solution or dispersion of the cupric compound may be carried out as a separate step, as by passing the filamentary material (whether as filaments, yarns, cords or fabrics) through a bath of the solution or dispersion or contacting the filamentary material with a roller, wick or other applicator to apply the solution thereto, or to spray the solution on to the filamentary material. The means of application will be selected as that best suited to the particular filamentary material and manufacturing operation. Thus, a fabric may be dipped, sprayed or padded. Filaments may be treated by any of the suggested procedures.

In the case of many filamentary products, the filaments are normally contacted with fluid baths for purposes other than stabilization, e.g. for lubrication, sizing, or, in the case of tire cord and the like, for the application of adhesives to enhance the bonding between the cord and the rubber in the tire or other article in which the cord is to be embedded. The practice of the present invention can be integrated into such processes by simply incorporating the cupric compound into the fluid bath.

POLYESTER FILAMENTARY MATERIALS

The filaments are, in general, filaments made from essentially linear high polymers having repeating ester linkages and cyclic or aromatic groups along the chain. Typical of these polymers are polyethylene terephthalate and other polyesters containing the residues of difunctional aromatic dicarboxylic acids and of alkylene glycols as disclosed in Whinfield et al. U.S. Pat. No. 2,465,319. Exemplary of diacyl radicals which may enter into the chains of such polymers are those of terephthalic acid, isophthalic acid, 5-t-butyl isophthalic acid, naphthalene dicarboxylic acids such as naphthalene 2,6 and 2,7 acids, diphenyldicarboxylic acids, diphenylether dicarboxylic acids, diphenylalkylene dicarboxylic acids, diphenyl sulfone dicarboxylic acids, azodibenzoic acids, pyridine dicarboxylic acids, quinoline dicarboxylic acids and analogous aromatic species including the sulfonic acid analogs; diacyl radicals containing cyclopentane or cyclohexane rings between the acyl groups; and all of the above types of acids having substituents such as alkyl or halogen or the rings thereof.

The glycol residues occurring in the polymer chains may be those of alkylene glycols such as ethylene, propylene or butylene glycol, alkylene glycols in which the alkylene chain is interrupted by ether or thioether groups or which contain aromatic or other rings such as are present in the diacyl residues discussed above.

The polyester will, of course, be of a fiber-forming degree of polymerization and capable of melt-spinning and orientation to the oriented crystalline state. To this end it should have an intrinsic viscosity of at least 0.6 IV, and preferably 0.75 to 1.0, as determined by dissolving 0.5 percent of the polyester at 25° C. in 0.5 percent by weight solution in 60/40 phenol/tetrachloroethane. The fibers are prepared by extruding the melted polymer through spinnerette orifices, cooling to solidified state, and elongating the filament to length so as to develop therein an oriented-crystalline structure. The filaments may be treated according to this invention, or yarns or cords (such as tire cords, etc.) produced from them or fabrics, etc. produced from cords or threads, may be treated.

The process is applicable generally to polyesters. Although the application refers more particularly to polyethylene terephthalate, it is equally applicable to the terephthalate of dimethylol cyclohexane, etc. including mixed copolymers.

THE DRAWINGS

The invention is further described in connection with the drawings which are flow sheets which illustrate various application procedures. If applied at an early stage in the manufacture of tire cords, it is understood that the filamentary material is subsequently processed into tire cord or the like and then built into tires, etc. by any usual procedure.

THE EFFECT OF THE TREATMENT ON THE POLYMERS

In general, the physical properties of the products are not adversely affected by the copper-salt treatment. The salt is one which does not form an oxidizing anion. If applied in water solution, it may be cupric citrate (applied in the presence of an alkaline citrate), sulfate, acetate, salicylate or formate. Other salts which may be employed as an emulsion, the oil phase of the emulsion being varied from polar to non-polar to afford the required solubility, include cupric oleate, linoleate, octoate, decanoate and butyrate. These latter salts may also be used as solutions or emulsions in petroleum solvents. Compounds which form an oxidizing anion cannot be used satisfactorily.

EXPERIMENTAL

Polyethylene terephthalate was used in the tests.

The following Table I gives comparative results. Sample No. 1 is the control—not treated with a copper salt. Sample No. 2 was treated with an aqueous solution of 0.1 percent cupric acetate and then treated with the same adhesive used on Sample No. 3. Sample No. 3 was treated with commercial rubber-to-polyester adhesive containing a polyester adhesive activator mixed with common resorcinol-formaldehyde-latex (RPL) dip which contained 0.1 percent of cupric acetate. The samples were prepared by dipping greige cord in the treating compositions and the standard tests were made on a Litzler Computreater. The standard conditions used were as follows. The cord was passed through three zones. It was dipped, then dried in Zone 1 and then heat-set in Zones 2 and 3 under the following conditions:

| ZONE | TIME | TEMPERATURE | STRETCH |
| --- | --- | --- | --- |
| 1 | 30 sec. | 250° F. | +3% |
| 2 | 45 sec. | 475° F. | 0 |
| 3 | 45 sec. | 475° F. | −1% |

The breaking strengths of the greige cord, before and after dipping, together with the retained tensile strength (% R) after curing in rubber at 300° F. for 25 minutes and aging for 24 hours at 350° F. are recorded in the following Table I:

| SAMPLE NO. | GREIGE CORD | DIPPED | % R | AGED IN RUBBER | % R |
| --- | --- | --- | --- | --- | --- |
| 1 | 15.4 | 13.3 | 86 | 2.0 | 13 |
| 2 | 15.4 | 13.9 | 90 | 4.0 | 26 |
| 3 | 15.4 | 13.6 | 88 | 3.9 | 25 |

When the copper salt is applied to polyester in aqueous solution, the polyester takes up some water, e.g. up to 4½ percent, which must then be evaporated, and usually this is done before adhesive is applied.

Cupric acetate may be used in water solution in concentrations varying from about 0.05 to 0.10 percent by weight, depending upon the method of application and the dwell time of the treatment. The objective is to incorporate from 20 to 1,000 ppm of copper on to the polyester filament, based on the weight of the polyester.

Figure 1:
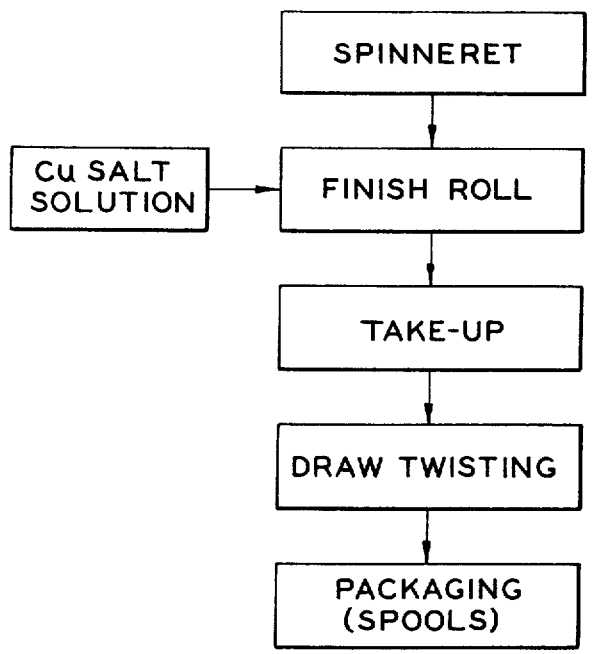
FIG. 1 illustrates the application of a cupric salt to the filaments on the finish roll.

FIG. 1 illustrates how the cupric salt may be applied to the spun filaments on the finish roll before drawing. The "Take-Up" is a festoon or the like which provides time for the salt to penetrate the filaments before they are drawn and tested. A satisfactory manner of applying the copper salt is from a finish roll partially immersed in the solution or dispersion of the salt, which rolls against the filaments on the finish roll. The lubricant, etc. usually applied at the finish roll may be separately applied at this roll or the copper salt may be mixed with it. Usually about 8,000 parts by weight per million parts of finish per million parts of polyester (0.8%) is used; a minimum of 20 parts per million (ppm) of copper is applied to the filamentary material, regardless of how it is applied, and this may be as much as 1,000 ppm, the preferred range being 50 to 500 ppm. The temperature of treatment is not critical.

Figure 2:
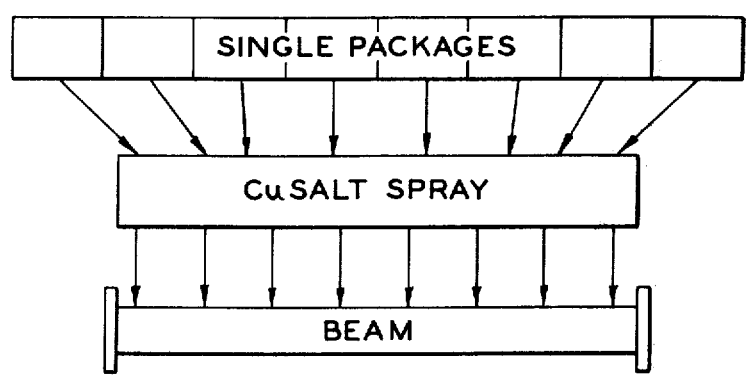
FIG. 2 illustrates the application of the cupric salt to the filaments as they are being transferred from single packages to a beam.

FIG. 2 illustrates the application of the cupric salt as a solution to polyester filaments as they are transferred from single packages to a beam. The spray may be applied while the filaments are on a roll, or in any suitable manner. The treated filaments may pass through a drier before reaching the beam, or they may be rolled on the beam while still wet.

Figure 2A:
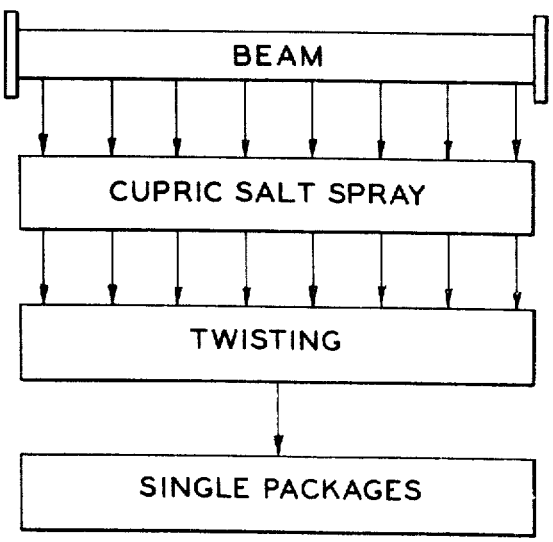
FIG. 2A illustrates the application of a cupric salt to the filaments before twisting.

Alternatively, the yarn from packages on a beam is sprayed or otherwise treated with a cupric salt just prior to twisting, and then formed into single packages of plied yarn or cord, as indicated in FIG. 2A.

Figure 3:
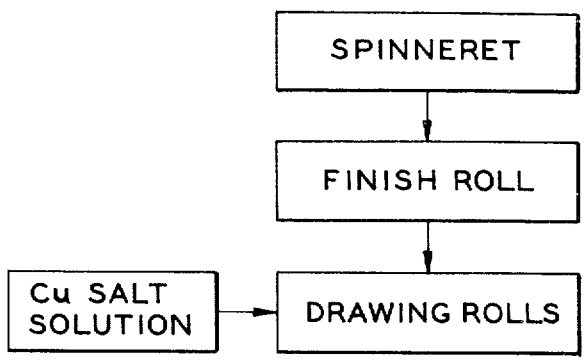
FIG. 3 illustrates the application of a cupric salt to the filaments on the draw rolls. Steps following the drawing of the filaments (mono-filaments or multi-filaments) are not illustrated.

FIG. 3 illustrates how the copper solution or dispersion may be applied to the filaments on the drawing rolls or while they are being transferred from one drawing roll to another. Tests have shown that good penetration is obtained if the application is made either before or after the filaments are drawn. Obviously, the yarn should not be too cold or too hot when it is drawn. It may be air dried. The draw rolls may be heated to 80° or 220° C. and at 250° to 485° C. for commercial operation when treating polyester. The water and/or kerosene or other liquid in which the copper salt is dissolved or dispersed, is evaporated by the heat of the draw roll or rolls.

Figure 4:
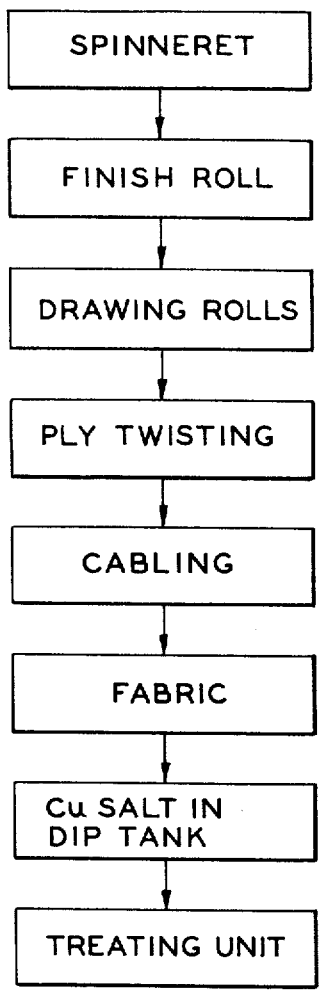
FIG. 4 illustrates the application of a cupric salt to fabric before adhesive is applied.

According to FIG. 4, the cupric salt is added just prior to or with the adhesive used in the preparation of tire fabric. The adhesive is usually an emulsion which includes latex. The copper salt may be in either the aqueous or nonaqueous phase. The copper in the adhesive should usually be about 0.05 to 0.10 percent of the weight of the adhesive. The subsequent "Treating Unit" is used to impart the desired properties to the tire fabric. The conditions of stretch or relaxation in this treatment, as well as the time and temperature are used to give desired physical properties to the filaments, yarns, cords or fabrics. The adhesive containing the copper salt may be applied at any temperature at which the adhesive without added salt is ordinarily applied—usually room temperature.

The foregoing illustrate only a few of the possible procedures in which the copper salt may be applied to the filamentary material.

We claim:

1. A rubber product containing filamentary material consisting essentially of polyester in contact with the rubber thereof, one million parts of the filamentary material containing a stabilizer consisting essentially of 20 to 1,000 parts of copper as a water solution or oil emulsion of a cupric salt of the class consisting of cupric citrate, sulfate, acetate, salicylate, formate, oleoate, linoleate, octoate, decanoate, and butyrate, which salt is surface applied, the concentration of the salt being greater adjacent the surface of the filaments in the material than farther from the surface.

2. The product of claim 1 in which the filamentary material is tire cord fabric of polyethylene terephthalate, and the salt is cupric acetate or sulfate.

3. A rubber product which includes material formed of filaments of polyethylene terephthalate containing 20 to 1,000 parts of copper as cupric acetate or sulfate per one million parts of the polyethylene terephthalate as a stabilizer, the cupric acetate or sulfate being nonuniformly dispersed in the material.

* * * * *